US008334988B2

(12) United States Patent
Sekine

(10) Patent No.: US 8,334,988 B2
(45) Date of Patent: Dec. 18, 2012

(54) INFORMATION PROCESSING DEVICE, INFORMATION PROCESSING SYSTEM, INFORMATION PROCESSING METHOD, AND COMPUTABLE-READABLE RECORDING MEDIUM, FOR MANAGING PROCESSING INFORMATION SETS

(75) Inventor: Yoshihiro Sekine, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1437 days.

(21) Appl. No.: 11/907,678

(22) Filed: Oct. 16, 2007

(65) Prior Publication Data

US 2008/0195663 A1 Aug. 14, 2008

(30) Foreign Application Priority Data

Feb. 13, 2007 (JP) ................................ 2007-032608

(51) Int. Cl.
*G06F 3/12* (2006.01)

(52) U.S. Cl. ....... 358/1.13; 358/1.9; 358/1.16; 715/273; 715/847; 715/745; 715/811; 715/765; 399/76; 399/77; 399/80; 399/81

(58) Field of Classification Search ................. 358/1.15, 358/1.9, 1.13, 1.16; 715/771, 847, 744, 839, 715/811, 825, 273, 274, 276, 200, 277; 700/17
See application file for complete search history.

(56) References Cited

U.S. PATENT DOCUMENTS 5,119,206 A * 6/1992 Rourke et al. ................ 358/296
5,821,926 A * 10/1998 Arita ............................. 715/744
6,005,567 A * 12/1999 Nielsen ......................... 715/823
6,380,951 B1 * 4/2002 Petchenkine et al. ......... 715/736
6,567,627 B2 * 5/2003 Maeda et al. .................. 399/81
6,978,095 B2 * 12/2005 Kato ............................... 399/81
7,408,658 B2 * 8/2008 Twede ......................... 358/1.15
7,913,168 B2 * 3/2011 Hoshino et al. ............... 715/273
7,913,189 B2 * 3/2011 Baba ............................. 715/847
2002/0080376 A1 * 6/2002 Momose et al. ............... 358/1.9
2005/0015728 A1 * 1/2005 Ragan et al. .................. 715/765
2005/0111866 A1 * 5/2005 Sato ............................... 399/79
2006/0092453 A1 * 5/2006 Okada et al. ................. 358/1.14
2006/0164677 A1 * 7/2006 Ahn ............................. 358/1.15
2007/0044040 A1 * 2/2007 Takahashi et al. ............ 715/853
2007/0226261 A1 * 9/2007 Urita .......................... 707/104.1
2008/0049247 A1 * 2/2008 Asai et al. .................... 358/1.15

FOREIGN PATENT DOCUMENTS

JP A-07-160462 6/1995

(Continued)

OTHER PUBLICATIONS

Dec. 13, 2011 Japanese Office Action issued in Japanese Patent Application No. 2007-032608 (with translation).

*Primary Examiner* — Twyler Haskins
*Assistant Examiner* — Dennis Dicker
(74) *Attorney, Agent, or Firm* — Oliff & Berridge PLC

(57) ABSTRACT

There is provided an information processing device that has a display control unit that causes, when one or more of setting items for specifying a processing are sequentially specified by a manipulation made by an operator, a display unit to display processing information sets each including setting items in a predetermined order on the basis of the sequentially specified setting items, and has a processing execution unit that executes a processing specified by setting items included in a processing information set specified by a manipulation made by the operator among the displayed processing information sets.

30 Claims, 8 Drawing Sheets

15a

| IDENTIFIER | PROCESSING INFORMATION SET | | | | | | | | | DATE |
|---|---|---|---|---|---|---|---|---|---|---|
| ••• | ••• | ••• | ••• | ••• | ••• | ••• | ••• | ••• | ••• | ••• |
| job1 | COPY | OUTPUT FORMAT | DADF | DOUBLE TO DOUBLE | 100% | AUTOMATIC SHEET | 2up | – | – | 06/08/11 |
| job2 | COPY | OUTPUT FORMAT | DADF | DOUBLE TO DOUBLE | 2up | 100% | BOOKLET | SORT | – | 06/08/12 |
| reg1 | COPY | OUTPUT FORMAT | DADF | COLOR | DOUBLE TO DOUBLE | 70% | AUTOMATIC SHEET | DOCUMENT TYPE (PHOTOGRAPH) | – | 06/08/13 |
| reg2 | COPY | OUTPUT FORMAT | DADF | 2up | 100% | DOUBLE TO DOUBLE | SORT | – | – | 06/08/13 |
| job3 | COPY | OUTPUT FORMAT | PLATEN | MONOCHROME | 100% | AUTOMATIC SHEET | SORT | – | – | 06/08/8 |
| job4 | SCANNER | BOX #123 | DOUBLE TO DOUBLE | AUTOMATIC % | – | – | – | – | – | 06/08/17 |
| job5 | Email | scot@□□.co.jp | 100% | – | – | – | – | – | – | 06/08/18 |
| job6 | COPY | BASIC COPY | DADF | COLOR | 100% | – | – | – | – | 06/08/19 |

FOREIGN PATENT DOCUMENTS

| | | |
|---|---|---|
| JP | A-08-123645 | 5/1996 |
| JP | A-10-271248 | 10/1998 |
| JP | A-2002-007020 | 1/2002 |
| JP | A-2002-202695 | 7/2002 |
| JP | A-2002-215278 | 7/2002 |
| JP | A-2005-259160 | 9/2005 |

* cited by examiner

FIG. 3

15a

| IDENTIFIER | PROCESSING INFORMATION SET | | | | | | | | | DATE |
|---|---|---|---|---|---|---|---|---|---|---|
| ••• | ••• | ••• | ••• | ••• | ••• | ••• | ••• | ••• | ••• | ••• |
| job1 | COPY | OUTPUT FORMAT | DADF | DOUBLE TO DOUBLE | 100% | AUTOMATIC SHEET | 2up | — | — | 06/08/11 |
| job2 | COPY | OUTPUT FORMAT | DADF | DOUBLE TO DOUBLE | 2up | 100% | BOOKLET | SORT | — | 06/08/12 |
| reg1 | COPY | OUTPUT FORMAT | DADF | COLOR | DOUBLE TO DOUBLE | 70% | AUTOMATIC SHEET | DOCUMENT TYPE (PHOTOGRAPH) | — | 06/08/13 |
| reg2 | COPY | OUTPUT FORMAT | DADF | 2up | 100% | DOUBLE TO DOUBLE | SORT | — | — | 06/08/13 |
| job3 | COPY | OUTPUT FORMAT | PLATEN | MONOCHROME | 100% | AUTOMATIC SHEET | SORT | — | — | 06/08/8 |
| job4 | SCANNER | BOX #123 | DOUBLE TO DOUBLE | AUTOMATIC % | — | — | — | — | — | 06/08/17 |
| job5 | Email | scot@□□.co.jp | 100% | — | — | — | — | — | — | 06/08/18 |
| job6 | COPY | BASIC COPY | DADF | COLOR | 100% | — | — | — | — | 06/08/19 |

15b

| CONTENT OF SETTING (SETTING ITEM) | WEIGHT |
|---|---|
| SERVICE | 500 |
| TAB OPERATION | 80 |
| DADF | 80 |
| MANUAL TRAY | 80 |
| SELECT DOUBLE/SINGLE-SIDED (DOUBLE TO DOUBLE) | 40 |
| MAGNIFICATION RATIO | 10 |
| TRAY (1 TO 4, AUTOMATIC) | 10 |
| COLOR MODE | 10 |
| SELECT DOUBLE/SINGLE-SIDED (DOUBLE TO SINGLE, SINGLE TO DOUBLE) | 40 |
| STAPLING | 40 |
| SORT | 10 |
| DOCUMENT TYPE | 10 |
| Nup | 40 |
| BOOKLET | 40 |
| ••• | ••• |

INFORMATION PROCESSING DEVICE, INFORMATION PROCESSING SYSTEM, INFORMATION PROCESSING METHOD, AND COMPUTABLE-READABLE RECORDING MEDIUM, FOR MANAGING PROCESSING INFORMATION SETS

CROSS-REFERENCE TO RELATED APPLICATION(S)

This application is based on and claims priority under 35 USC 119 from Japanese Patent Application No. 2007-032608 filed Feb. 13, 2007.

BACKGROUND

1. Technical Field

The present invention relates to an information processing device, information processing system, information processing method, computable-readable recording medium, and computer data signal.

2. Related Art

Information processing devices such as printers and copiers are becoming increasingly highly sophisticated in their functionality. However, such high functionality brings with it an increase in complex manipulations required for setting of content processing to be executed by such information processing devices.

SUMMARY

According to one aspect of the invention, an information processing device includes: a processing execution unit that executes processings each of which is specified by one or more setting items; a processing information storage unit that stores one or more processing information sets each of which includes one or more setting items specifying one of processings executed by the processing execution unit; a manipulation detection unit that detects a manipulation made by an operator; and a display control unit that causes, when one or more of the setting items are sequentially specified by a manipulation detected by the manipulation detection unit, a display unit to display the processing information sets stored in the processing information storage unit, the processing information sets being arranged in a predetermined order on the basis of the specified setting items, wherein when the operator makes a manipulation to specify one of the processing information sets displayed by the display unit, the manipulation detection unit detects the manipulation, and the processing execution unit executes one of the processings that is specified by setting items included in the specified one of the processing information sets.

BRIEF DESCRIPTION OF THE DRAWINGS

Exemplary embodiment(s) of the present invention will now be described with reference to the accompanying drawings, wherein like elements are denoted by like reference numerals.

FIG. 3 shows an example of processing information sets 15*a;*

DETAILED DESCRIPTION

Exemplary embodiments of the invention will now be described referring to an example of utilizing an image forming device, such as a printer or copier, as an information processing device which executes processings specified by different manipulations conducted by an operator.

1. First Exemplary Embodiment

The first exemplary embodiment of the invention will now be described.

1-1. Structure

Figure 1:
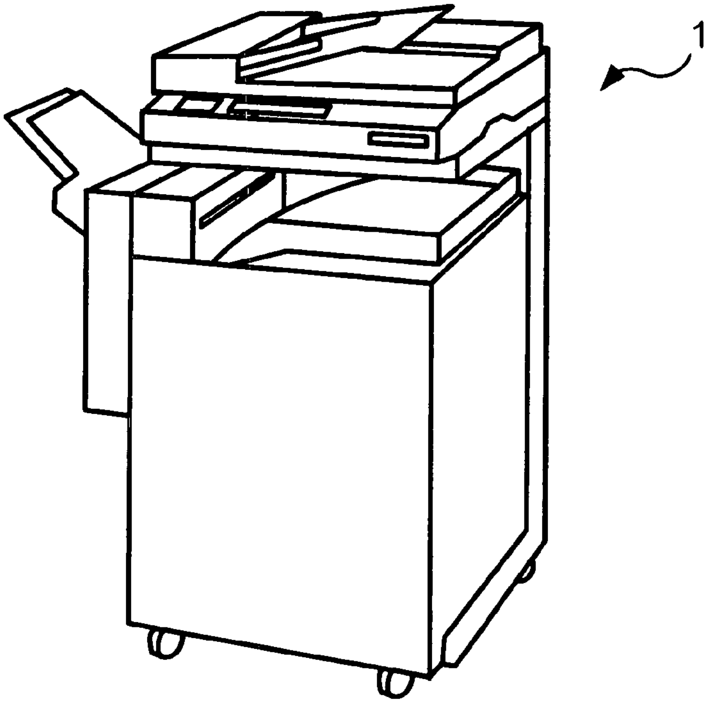
FIG. 1 is a perspective view showing an appearance of an image forming device 1.
Figure 2:
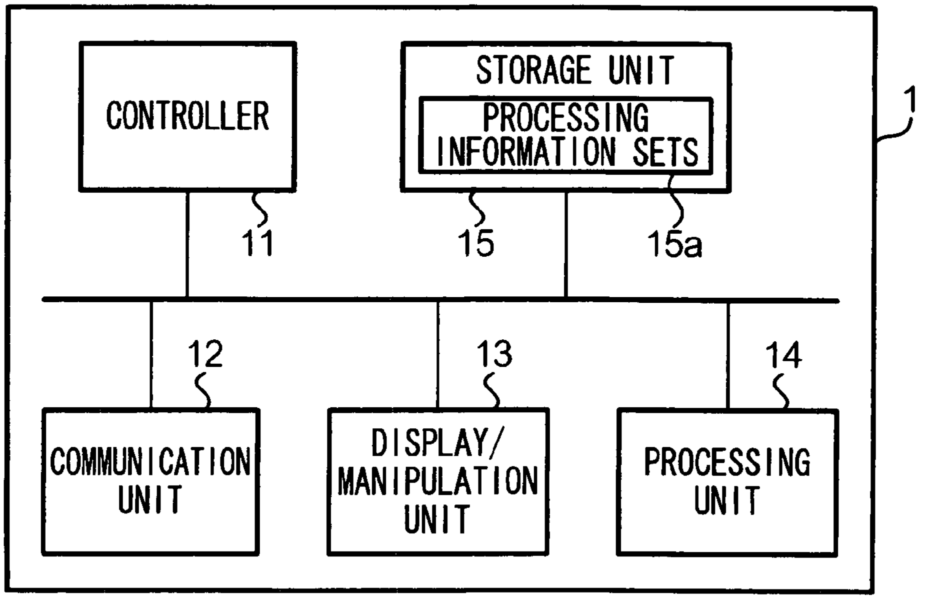
FIG. 2 is a block diagram showing a structure of the image forming device 1 according to the first exemplary embodiment of the invention.

FIG. 1 is a perspective view showing an appearance of an image forming device 1 according to the present exemplary embodiment. FIG. 2 is a block diagram showing the structure of the image forming device 1. As shown in FIGS. 1 and 2, the image forming device 1 has a controller 11, a communication unit 12, a display/manipulation unit 13, a processing unit 14 and a storage unit 15. The controller 11 includes, for example, a CPU (Central Processing Unit), a ROM (Read Only Memory), and a RAM (Random Access Memory), and controls respective components of the image forming device 1. The ROM stores a basic control program executed by the CPU. The communication unit 12 transmits/receives data to/from external devices connected via a network. The display/manipulation unit 13 includes, for example, a touch panel display and buttons for carrying out various operations. Based on image data supplied from the controller 11, the display/manipulation unit 13 shows various images, and accepts manipulations from an operator to thereby provide instructions for various processings.

Using image information, the processing unit 14 executes various processings each based on plural setting items (which constitute a content of a setting), to thereby realize plural different functions, such as a scanner function and a copier function. The scanner functions to read images from a paper sheet, which is set on a platen glass or in an automatic sheet feed device, and to generate image data expressing the read images. The copier functions to form an image on a paper sheet, based on the image data generated by the scanner function.

The storage unit 15 is a large-capacity storage device such as a HDD (Hard Disk Drive). This storage unit 15 stores processing information sets 15*a* each including setting items for a corresponding processing which have already been executed by the processing unit 14. The processing information sets are stored, related to dates when a respective corresponding processing was executed. The processing information sets 15*a* are respectively assigned with identifiers (as identification information) for identifying the processing information sets 15*a*.

FIG. 3 shows an example of processing information sets 15*a*.

For example, a processing information set 15*a* assigned with an identifier "job1" includes, as content of a setting, setting items "copy", "output format", "DADF", "double to double", "100%", "automatic sheet", and "2 up". A processing related to this processing information set 15*a* was executed on "06/08/11". Each time a processing is executed by the processing unit 14, the storage unit 15 is caused to store, additionally, a new processing information set 15*a* related to the processing that has been executed. In other words, each processing is based on plural setting items, and content of each processing depends on content of a setting constituted by the setting items. Setting items are classified into a hierarchical structure, in which setting items such as "copy", "scanner", "email" and the like are classified in a top layer. Setting items classified in a middle layer, which layer is subordinate to the setting item "copy" may be, for example, "basic copy", "output format", and "reading method". Further, a lower layer subordinate to the setting item "output format" includes, for example, setting items "select double/single-sided", "sort", "all into one sheet (Nup)", and "make a booklet". It is to be noted that the acronym "DADF" stated above is an abbreviation for "Duplex Auto Document Feeder", which in the context of a content setting in this case means that an automatic sheet feed device is set as a sheet supply source.

Further, the storage unit 15 stores processing information sets 15*a* each including setting items which have been registered by manipulation of an operator, with the processing information sets 15*a* related respectively to their own registration dates. In the figure, a processing information set 15*a* assigned with an identifier "regN" (where N is an integer) does not relate to a processing that has already been executed in the past but rather to one that has been registered by manipulation of an operator. For example, a processing information set 15*a* assigned with an identifier "reg1" includes setting items "copy", "output format", "DADF", "color", "double to double", "70%", "automatic sheet", and "document type (photograph)", and is assigned a registration date "06/08/13". Thus, when an operator considers it highly possible that a processing will be executed in the future with the content of a setting constituted by the setting items described above, the operator can register in advance the setting items as a processing information set 15*a*. Each time processing information is newly registered, a new registered processing information set 15*a* is added.

1-2 Operation

Operation of this exemplary embodiment will now be described with reference to the flowchart shown in FIG. 4.

Figure 5:
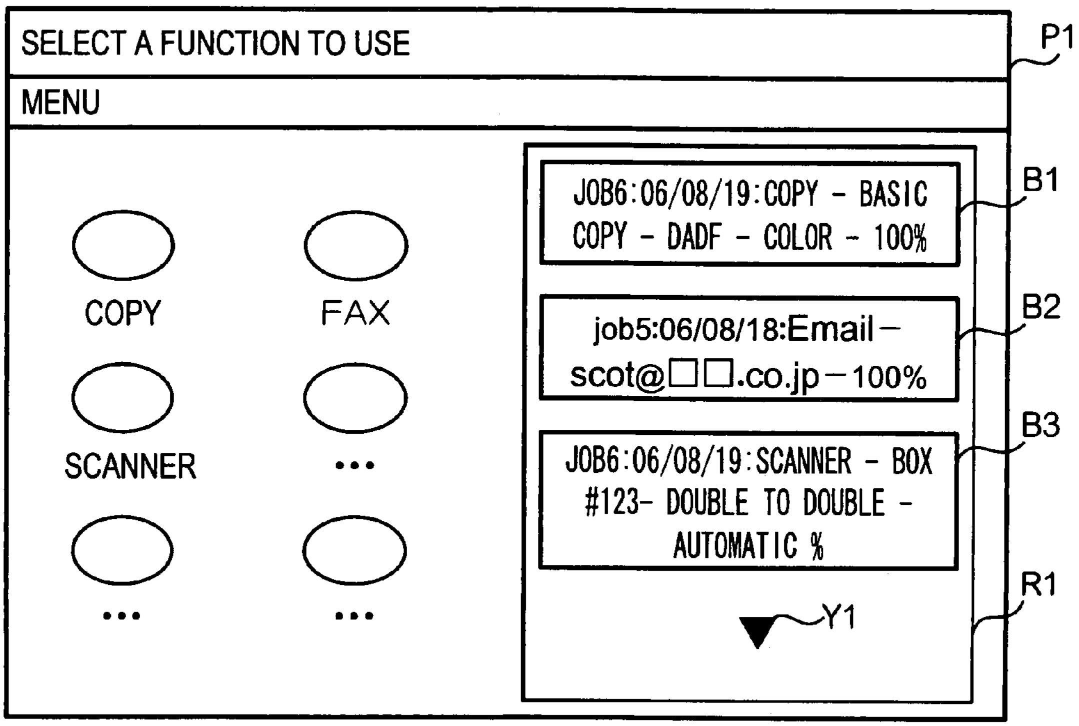
FIG. 5 shows a menu screen P1.

While no manipulation is made by an operator using the image forming device 1, the controller 11 controls the display/manipulation unit 13 to show a menu screen P1 as shown in FIG. 5 (step S100), and stands by until manipulation is made (step S10: NO). Images for selecting respective functions such as "copy", "scanner", and "FAX", and a processing information list R1 are provided in the menu screen P1. In the processing information list R1, plural processing information sets 15*a* stored in the storage unit 15 are listed in order from one related to the most recent date among dates related to the processing information sets 15*a*. For example, at the top of the processing information list R1, there is ranked a processing information set 15*a* assigned with an identifier "job6", which is related to the most recent date among the processing information sets 15*a* shown in FIG. 3. Subsequently in the processing information list R1, a processing information set 15*a* assigned with an identifier "job5" is ranked second, related to the second most recent date among the processing information sets 15*a* shown in FIG. 3. A processing information set 15*a* assigned with an identifier "job4" is ranked third. In the illustrated example, these processing information sets 15*a* are displayed as buttons B1, B2, and B3 to specify processings corresponding to the processing information sets 15*a*, respectively. Identifiers, dates, and setting items related to the processing information sets 15*a* stored in the storage unit 15 are displayed as labels for distinguishing the buttons B1, B2, and B3 from each other. Also in the processing information list R1, there is provided an arrow button Y1 for displaying (e.g., scrolling) other processing information sets 15*a* which are now not shown due to size limitation of the display area. If the display/manipulation unit 13 is manipulated and the arrow button Y1 is pressed, the fourth and more processing information sets 15*a* can be displayed in the processing information list R1.

For example, the display/manipulation unit 13 is manipulated on the menu screen P1 and the button B3 "job4: 06/08/17: scanner box #123—double to double—automatic %" is pressed. The controller 11 then detects this manipulation (step S110 in FIG. 4: YES), and further determines whether a processing information set 15*a* has been specified by the manipulation or not (step S120). In this example, a manipulation of specifying a processing information set 15*a* assigned with an identifier "job4" is detected in the step S110. Therefore, the controller 11 determines that a processing information set 15*a* has been specified (step S120: YES). The controller 11 subsequently causes the display/manipulation unit 13 to display content of a setting (e.g., setting items) for a processing related to the specified processing information set 15*a* (step S140). In this example, there are displayed setting items for the processing information set 15*a* assigned with "job4" (e.g., "scanner", "box #123", "double to double", and "automatic %"), which is stored in the storage unit 15, and other setting items which are specified in advance as defaults. A device designer or operator specifies, in advance, such other setting items which would be often selected as default items. Examples of such default setting items are "monochrome" indicating a kind of color mode, "text" indicating image quality of a document, and the like.

Figure 4:
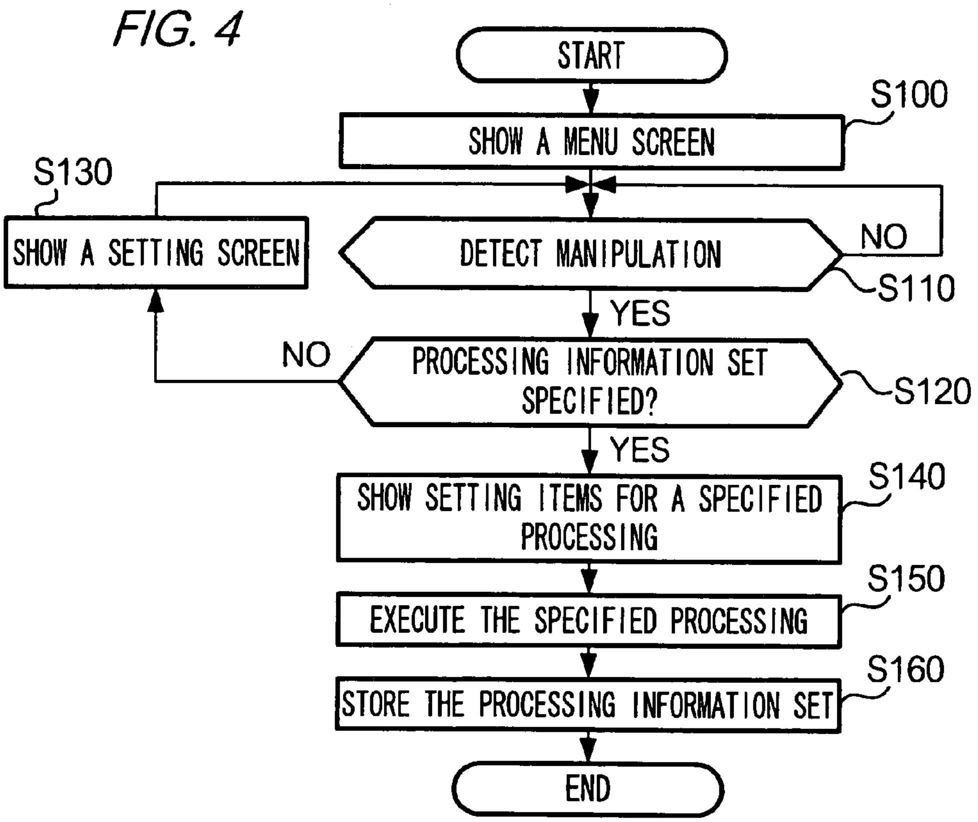
FIG. 4 is a flowchart showing operation.

When a start button on the display/manipulation unit 13 is pressed, the controller 11 determines whether a manipulation for an instruction for execution of a particular processing has been made, and executes the processing (step S150 in FIG. 4). In this example, a processing related to the processing information set 15*a* assigned with "job4" is executed, e.g., images are read at an automatically selected magnification ratio from two surfaces of a paper sheet as an original document, and generated image data are stored in a box (storage area) numbered at #123. Further, the controller 11 assigns a new identifier to the processing information set 15*a* including setting items specified by the manipulation detected in the step S110. The controller 11 causes the storage unit 15 to store the processing information set 15*a* assigned with the identifier, related to a date when the processing was executed (step S160). That is, to the storage unit 15 there is added a new processing information set 15*a* having the content of a setting which is constituted by setting items "scanner", "box #123", "double to double", and "automatic %".

On the other hand, there can be envisaged a case where, for example, a button "copy" for selecting a copy function is pressed on the menu screen P1 shown in FIG. 5, and manipulation is then conducted to set an "output format" for the copy function. In this case, the step S110 shown in FIG. 4 functions to detect a manipulation of pressing down the button "copy" as a setting item which is classified in a top layer, and a manipulation of selecting the "output format" as a setting item which is classified in a middle layer subordinate to the top layer. Since neither of these manipulations is used to specify any processing information set 15*a*, it is determined in the step S120 that no processing information set 15*a* is specified (step S120: NO).

Figure 6:
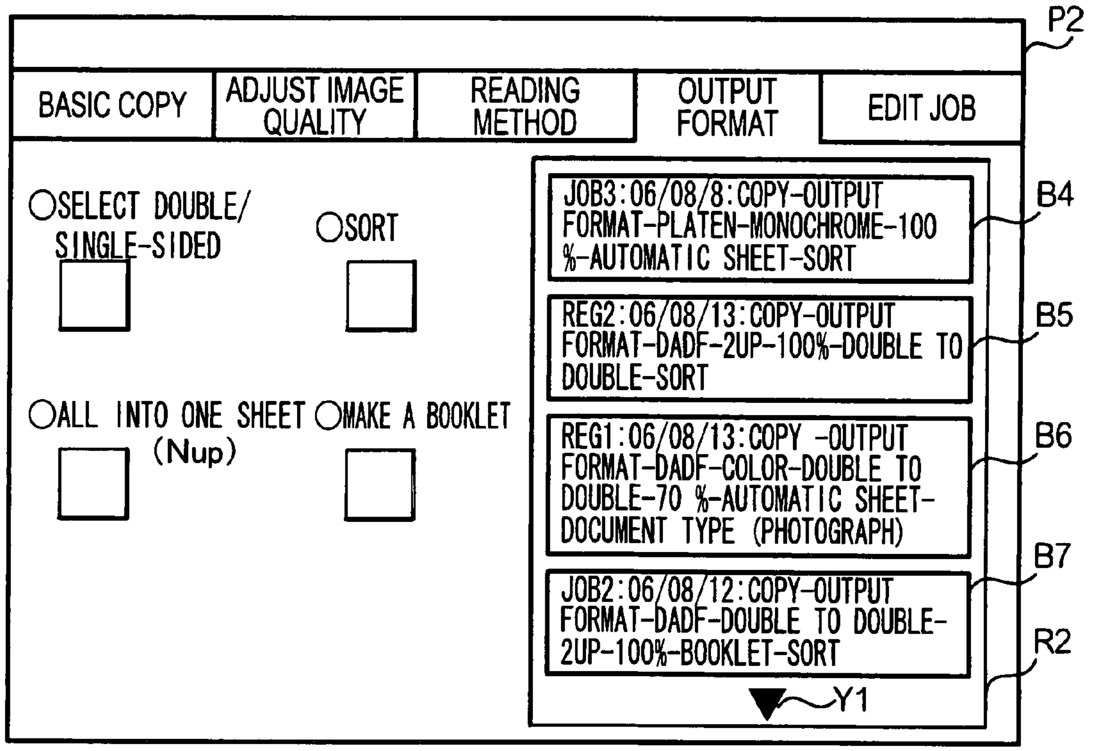
FIG. 6 shows a setting screen P2.

Subsequently, the controller 11 causes the display/manipulation unit 13 to display a setting screen P2 shown in FIG. 6 (step S130). In the setting screen P2, there are provided a processing information list R2 and images for specifying setting items. The setting items are, for example, "select double/single-sided", "sort", "all into one sheet (Nup)", and "make a booklet" which are classified into a much lower layer subordinate to the setting item "output format" under "copy". The "select double/single-sided" is a setting item concerning a processing for reading and forming images either in a double-sided or single-sided manner. The "sort" is a setting item for ejecting paper sheets while being sorted. The "all into one sheet (Nup)" is a setting item concerning a processing for forming plural images into one paper sheet. The "make a booklet" is a setting item for forming images in such an order as to make a booklet if a paper sheet having the images formed is afterward folded in half.

Described next are details of a method for obtaining an order of processing information sets 15*a* listed in the processing information list R2.

In the processing information list R2, processing information sets 15*a* stored in the storage unit 15 are listed in an order from a processing information set 15*a* which includes the greatest number of setting items specified in the step S110. Further, if plural processing information sets 15*a* are ranked even in the order, the even ranked plural processing information sets 15*a* are then arranged in an order from a processing information set 15*a* which is related to the most recent date. For example, if plural processing information sets 15*a* shown in FIG. 3 are arranged in an order from a processing information set 15*a* which includes the greatest number of setting items specified in the step S110, every processing information set 15*a* including both the setting items "copy" and "output format" should be ranked first. In this case, processing information sets 15*a* assigned with "job1", "job2" "reg1", "reg2", and "job3" are classified in the first rank in the order. Next, a processing information set 15*a* assigned with "job6" including only the setting item "copy" is assigned the next rank in the order. Further, processing information sets 15*a* assigned with "job4" and "job" which include neither the setting item "copy" nor "output format" are assigned the lowest rank in the order.

Subsequently, the processing information sets 15*a* assigned with "job1", "job2" "reg1", "reg2", and "job3" which are ranked even in the first rank are further arranged in an order from a processing information set 15*a* related to the most recent date stored in the storage unit 15. As a result, the processing information set 15*a* assigned with "job3", which is related to the most recent date, is ranked at the top of the processing information list R2 shown in FIG. 6. The processing information set 15*a* assigned with "reg2", which is related to the second most recent date, is ranked second, as well as the processing information set 15*a* assigned with "reg1" is ranked third. The processing information set 15*a* assigned with "job2" is ranked fourth. In the illustrated example, these processing information sets 15*a* are displayed as buttons B4, B5, B6, and B7 for specifying processings related to the processing information sets 15*a*, respectively. Fifth and more processing information sets 15*a* can be displayed by pressing an arrow button Y1 provided in the processing information list R2. However, the processing information sets 15*a* assigned with "job4", "job5", and "job6" are not displayed because at least one of the setting items "copy" and "output format" is not included in each of these processing information sets 15*a*. That is, only processing information sets 15*a*, each of which includes both of the setting items "copy" and "output format", are arranged in the processing information list R2.

With the setting screen P2 displayed, for example, an operator sets a paper sheet on the automatic sheet feed device. In the step S110 shown in FIG. 4, a sensor provided in the automatic sheet feed device detects a manipulation of setting the paper sheet (step S110: YES). Since this manipulation is not done to specify any processing information set 15*a*, it is determined in the step S120 that no processing information set 15*a* is specified (step S120: NO).

Figure 7:
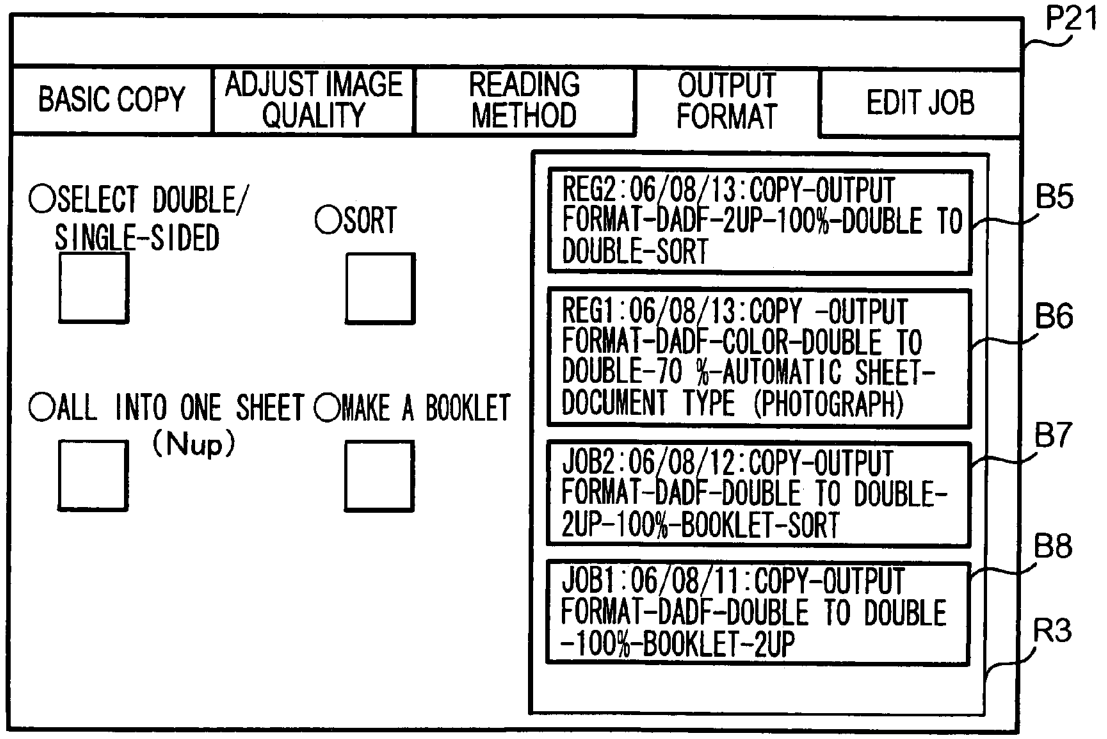
FIG. 7 shows a setting screen P21.

Subsequently, in a step S130, a setting screen P21 shown in FIG. 7 is displayed on the display/manipulation unit 13. In the setting screen P21, there are provided images for specifying setting items classified in a layer subordinate to the setting item "output format" under "copy". The images are the same as those in the setting screen P2. Also in the setting screen P21, a processing information list R3 is provided in place of the processing information list R2 in the setting screen P2. An order of processing information sets 15*a* listed in the processing information list R3 is obtained in the same manner as in a previous case of obtaining an order in the processing information list R2 described above. That is, processing information sets 15*a* shown in FIG. 3 are arranged in an order from a processing information set 15*a*, which set includes a majority of setting items "copy", "output format", and "DADF" specified in the step S110. Processing information sets 15*a* which are ranked even in order are further arranged in an order from a processing information set 15*a* related to the most recent date. As a result, the processing information set 15*a* assigned with "reg2" is ranked first in the processing information list R3. The processing information sets 15*a* assigned with "reg1", "job2", and "job1" are respectively ranked second, third, and fourth in the list. In the illustrated example, these processing information sets 15*a* are displayed as buttons B5, B6, B7, and B8 for specifying processings related to the processing information sets 15*a*, respectively. Although a processing information set 15*a* assigned with "job3" is ranked first in the processing information list R2, this processing information set 15*a* is listed too low and therefore not displayed now inside the list because of omission of the setting item "DADF". That is, only processing information sets 15*a* which include all of the setting items "copy", "output format", and "DADF" are listed in the processing information list R3.

On the setting screen P21, the display/manipulation unit 13 is manipulated, e.g., the button "all into one sheet (Nup)" is pressed to specify a setting item "2up" for forming two images on one sheet. In this case, in the step S110 in FIG. 4, a manipulation of specifying the setting item "2up" is detected (step S110: YES). Since this manipulation is not used to specify a processing information set 15*a*, it is determined in the step S120 that no processing information set 15*a* is specified (step S120: NO).

Figure 8:
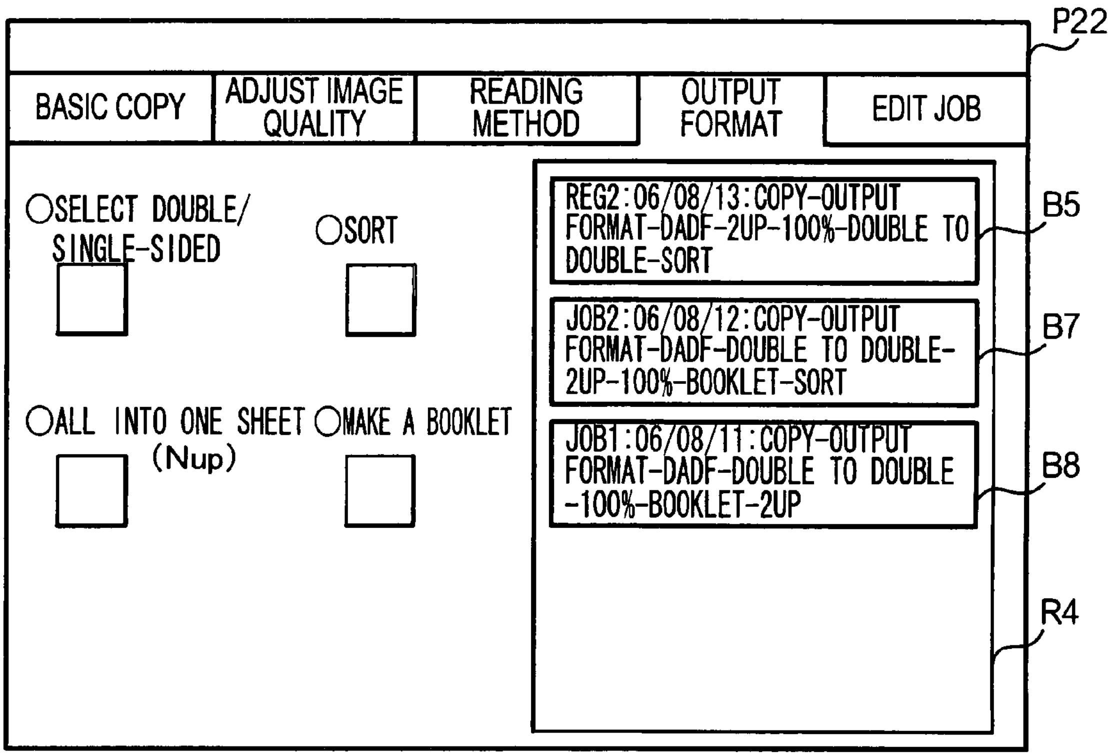
FIG. 8 shows a setting screen P22.

Subsequently, in a step S130, a setting screen P22 shown in FIG. 8 is displayed on the display/manipulation unit 13. In the setting screen P22, there are provided images for specifying setting items classified in a layer subordinate to the setting item "output format" under "copy", as in the setting screen P21 described previously. Also in the setting screen P22, a processing information list R4 is provided in place of the processing information list R3 in the setting screen P21. An order of processing information sets 15*a* listed in the processing information list R4 is obtained in the same manner as in a previous case of obtaining an order in the processing information list R2 described above. That is, processing information sets 15*a* shown in FIG. 3 are arranged in an order from a processing information set 15*a* including a majority of setting items "copy", "output format", "DADF", and "2up". Processing information sets 15*a* which are ranked even in order are further arranged in an order from a processing information set 15*a* related to the most recent date stored in the storage unit 15. As a result, the processing information set 15*a* assigned with "reg2" is ranked first in the processing information list R4. The processing information sets 15*a* assigned with "job2" and "job1" are respectively ranked second and third in the list. In the illustrated example, these processing information sets 15*a* are displayed as buttons B5, B7, and B8 for specifying processings related to the processing information sets 15*a*, respectively. Although a processing information set 15*a* assigned with "reg1" is ranked second in the processing information list R3 described previously, this processing information set 15*a* is not displayed in the list R3 due to omission of the setting item "2up". That is, only processing information sets 15*a*, each of which includes all of the setting items "copy", "output format", "DADF", and "2up" are listed in the processing information list R4.

On the setting screen P22, the display/manipulation unit 13 is manipulated to select, for example, the button B5 "reg2: 06/08/13: copy—output format—DADF—2up—100%—double to double—sort" form the processing information list R4. In the step S110 in FIG. 4, a manipulation of specifying the processing information set 15*a* assigned with the identifier "reg2" is detected (step S110: YES). Since this manipulation is used to specify a processing information set 15*a*, it is determined in the step S120 that a processing information set 15*a* has been specified (step S120: YES). Subsequently in the step S140, content (e.g., setting items) of a setting related to the specified processing information set 15*a* is displayed. In the step S150, the specified processing is executed. In this example, a processing corresponding to the processing information set 15*a* assigned with "reg2" is executed. That is, images are read at a magnification ratio of 100% from two surfaces of a paper sheet as an original document which is set on the automatic sheet feed device, to generate two image data sets. The images expressed by the two generated image data sets are formed on one paper sheet, which is ejected while being sorted. In the step S160, a new identifier is assigned to the processing information set 15*a* including content of the setting (e.g., setting items) specified by the manipulation detected in the step S110. The processing information set 15*a* is stored in the storage unit 15, related to the date when the processing was executed. That is, to the storage unit 15 there is added with a new processing information set 15*a* having a content of a setting constituted by the setting items "copy", "output format", "DADF", "2up", "100%", "double to double", and "sort".

2. Second Exemplary Embodiment

Next, the second exemplary embodiment of the invention will be described.

2-1. Structure

Figure 9:
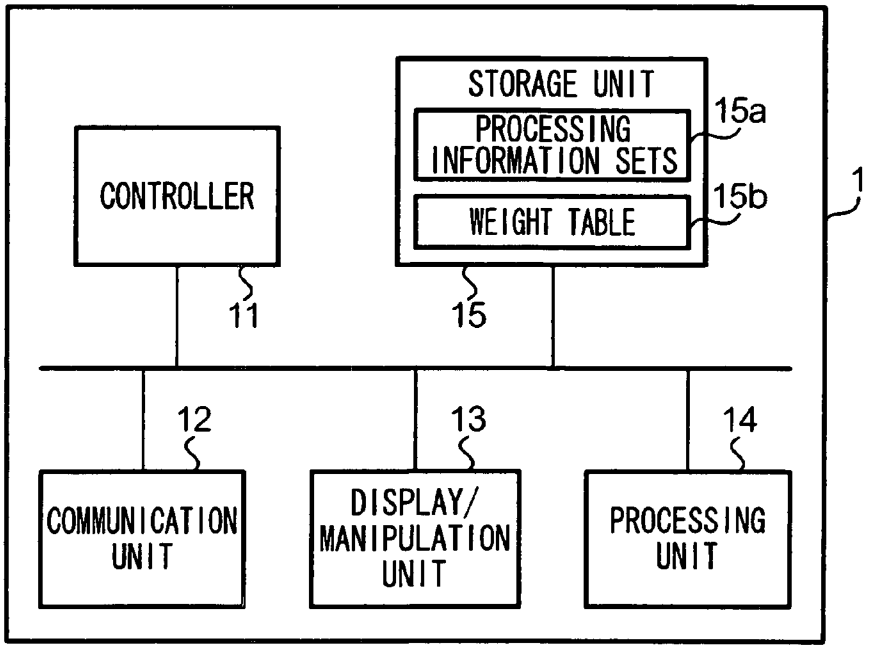
FIG. 9 is a block diagram showing a structure of an image forming device 1 according to the second exemplary embodiment of the invention.

FIG. 9 is a block diagram showing a structure of an image forming device 1 according to the second exemplary embodiment. As shown in the figure, the image forming device 1 has the same structure as that according to the first exemplary embodiment shown in FIG. 2 except for content of the storage unit 15. The storage unit 15 stores a weight table 15*b* in addition to processing information sets 15*a* described above.

Figures 10, 11:
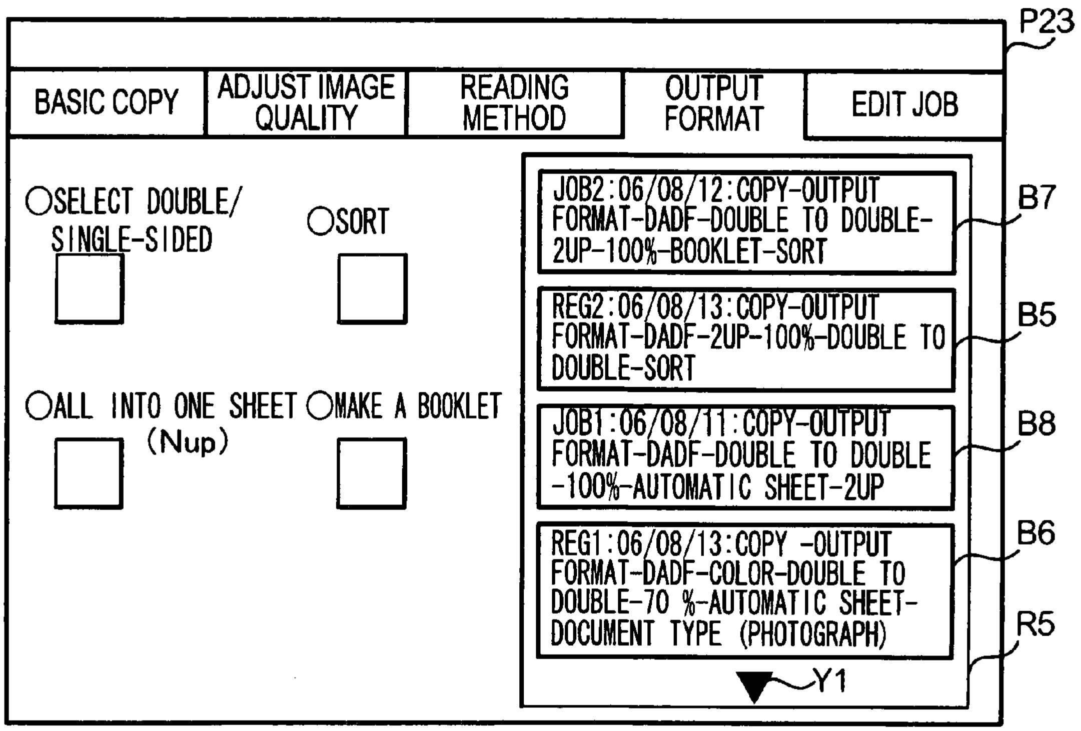
FIG. 10 shows an example of a weight table 15*b;*
FIG. 11 shows a setting screen P23.

FIG. 10 shows an example of the weight table 15*b*. As shown in the figure, in the weight table 15*b*, setting items provided in advance for the image forming device 1 are respectively related to weights (as weight information) allocated to the setting items. For example, "500" is allocated as weight information to a setting item "service", as well as "80" is allocated to a setting item "tab operation". The setting item "service" expresses content of a setting which is specified by pressing any of buttons for selecting of functions (e.g., "copy" button, "scanner" button, "FAX" button, etc.) on the menu screen P1 shown in FIG. 5. In other words, the setting item "service" is equivalent to setting items which are classified in the top layer in the hierarchical structure formed by setting items. Meanwhile, the setting item "tab operation" expresses content of a setting (or a manipulation) of selecting any of tabs for classifying setting items (e.g., "basic copy" tab, "adjust image quality" tab, "reading method" tab, "output format" tab, "edit job" tab, etc.). In other words, the setting item "tab operation" is equivalent to setting items classified in the middle layer in the hierarchical structure formed by setting items.

The weights (weight information) are preset by a manufacturer of the image forming device 1 or the like. In this example, weights are so set that setting items (such as "service" and "tab operation") which are classified in a higher layer in the hierarchical structure and/or which are more frequently specified in common to all processings are weighted more heavily. On the other side, setting items parameters of which can be changed (such as a "magnification ratio" and the like) are weighted less heavily.

2-2. Operation

Next, operation of the second exemplary embodiment will be described. The operation of the second exemplary embodiment differs from that of the first exemplary embodiment only in the method for obtaining an order of processing information sets 15*a*. Hence, the following description will be directed only to the method for obtaining an order of processing information sets 15*a*, and description about the other features of operation will be omitted.

The following description will be made referring to an example of making manipulations for specifying setting items "copy", "output format", "DADF", "2up", "sort", and "booklet". Since none of these manipulations is used to specify a processing information set 15*a*, it is determined in the step S120 that no processing information set 15*a* is specified (step S110: NO). Subsequently in the step S130, a setting screen P23 shown in FIG. 11 is displayed on the display/manipulation unit 13. The setting screen P23 is the same as the setting screen P22, with respect to the images for specifying various setting items concerning an output format for copying. However, a processing information list R5 is provided in place of the processing information list R4.

In the processing information list R5, processing information sets 15*a* stored n the storage unit 15 are listed in an order from a processing information set 15*a* including a majority of setting items which are specified by using the weight table 15*b*. More specifically, at first, processing information sets 15*a* each including at least one of setting items "copy", "output format", "DADF", "2up", "sort", and "booklet" are extracted from the processing information sets 15*a* shown in FIG. 3. In this example, processing information sets 15*a* assigned with "job1", "job2", "reg1", "reg2", "job3", and "job6" are extracted. Processing information sets 15*a* assigned with "job4" and "job5" do not include any of the foregoing setting items and are therefore not extracted.

Subsequently, a sum of weights allocated to respective setting items included in each of the processing information sets 15*a* is calculated by referring to the weight table 15*b*. For example, a processing information set 15*a* assigned with "job1" includes setting items "copy", "output format", "DADF", and "2up". Referring to the weight table 15*b* in FIG. 10, the sum of weights allocated to these setting items is obtained as 500+80+80+40=700. Further, the sum of weights (=700) is taken as a weight information value for the processing information set 15*a* assigned with "job1". Similarly, weights are calculated for the other processing information sets 15*a* assigned with "job2", "reg1", "reg2", "job3", and "job6" to obtain "750", "660", "710", "590", and "580" as weight information values, respectively.

Further, an order of the calculated weight information values arranged from the greatest weight information value is specified as the order of processing information sets 15*a* arranged from a processing information set 15*a* including a majority of the specified setting items. As a consequence, the processing information set 15*a* assigned with "job2" is ranked at the top in the processing information list R5 shown in FIG. 11. Similarly, the processing information sets 15*a* assigned with "reg2", "job1", and "reg1" are respectively ranked second, third, and fourth in the processing information list R5. In the illustrated example, the processing information sets 15*a* are displayed as buttons B7, B5, B8, and B6 for specifying processings related to the processing information sets 15*a*, respectively. However, processing information sets 15*a* assigned with "job3" and "job6" have small weight information values, and can therefore be displayed only by pressing an arrow button Y1 provided in the processing information list R5.

3. Modifications

The exemplary embodiments described above can be modified as follows. Further, modifications which are described below can be appropriately combined with each other.

(1) Processing information sets 15*a* each need to include content of a setting for an executed processing but can also include a variety of other information.

Figure 12:
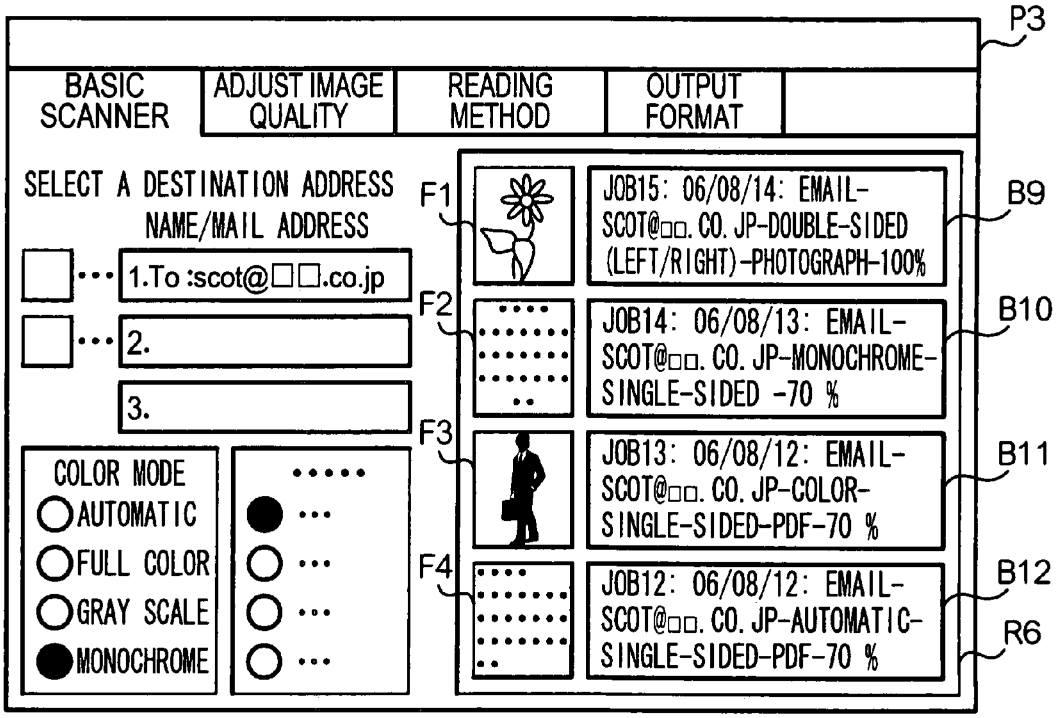
FIG. 12 shows a setting screen P3.

For example, the storage unit 15 can store processing information sets 15*a*, which include contents of settings for various processings executed by the processing unit 14, and image information used for the processings. The image information can be, for example, a downscaled version of image data which the processing unit 14 generates by reading an image from a paper sheet, or a downscaled version of image data which is transmitted from a host device (not shown). The controller 11 causes the display/manipulation unit 13 to display processing information sets 15*a* each including image information. FIG. 12 shows a setting screen P3 in which processing information sets 15*a*, each including image information, are listed. As shown in the figure, in a processing information list R6 provided in the setting screen P3, there are provided buttons B9, B10, B11, and B12 for specifying processings related to the processing information sets 15*a*, and images F1, F2, F3, and F4 used in the processings, with the buttons respectively related to the images.

Figure 13:
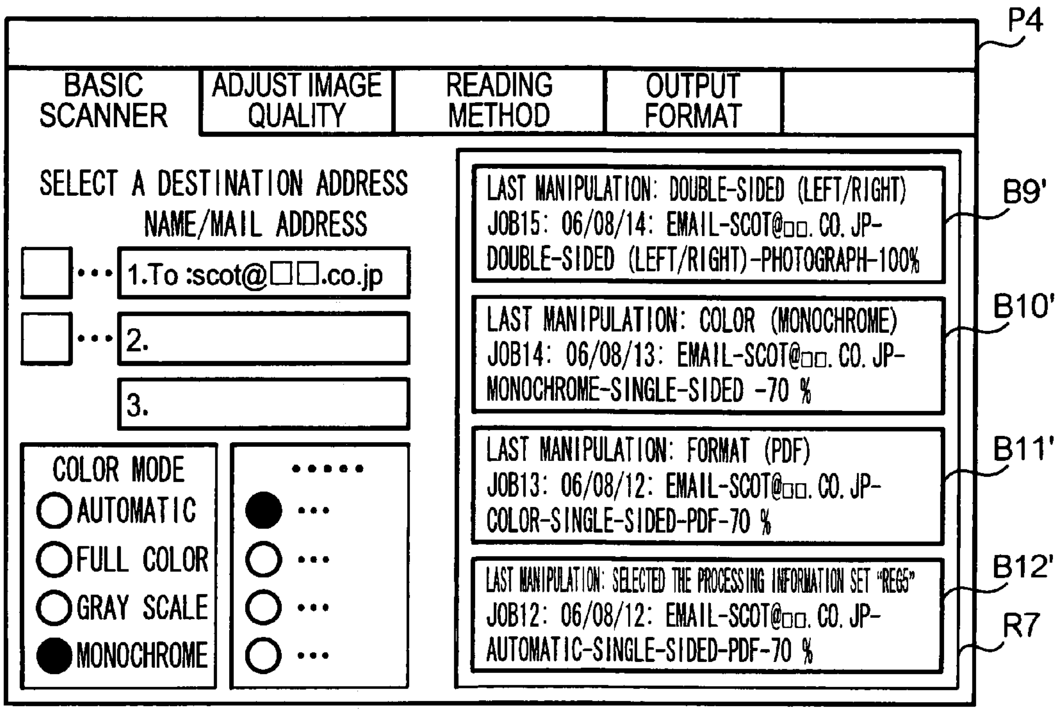
FIG. 13 shows a setting screen P4.

(2) Setting items constituting content of a setting for a processing which was already executed by the processing unit 14 were specified sequentially by an operator. The storage unit 15 can store the setting items in a format capable of distinguishing the setting item which was specified last, from the other setting items. An example of such a format is one that allows a flag to be stored which is related to the setting item which was specified last by an operator. For example, if setting items are specified in an order of "copy", "output format", and "double to double", the setting item "double to double" is specified last. Therefore, a flag is stored related to this setting item "double to double". The controller 11 causes the display/manipulation unit 13 to display the setting item specified last as a processing information set 15*a*. FIG. 13 shows a setting screen P4 in which processing information sets 15*a* are provided, respectively including setting items specified last. As shown in the figure, buttons B9', B10', B11', and B12' for specifying processings related to the processing information sets 15*a* are provided in a processing information list R7 provided in the setting screen P4. The buttons are respectively labeled with the setting items specified last each as "last manipulation".

Figure 14:
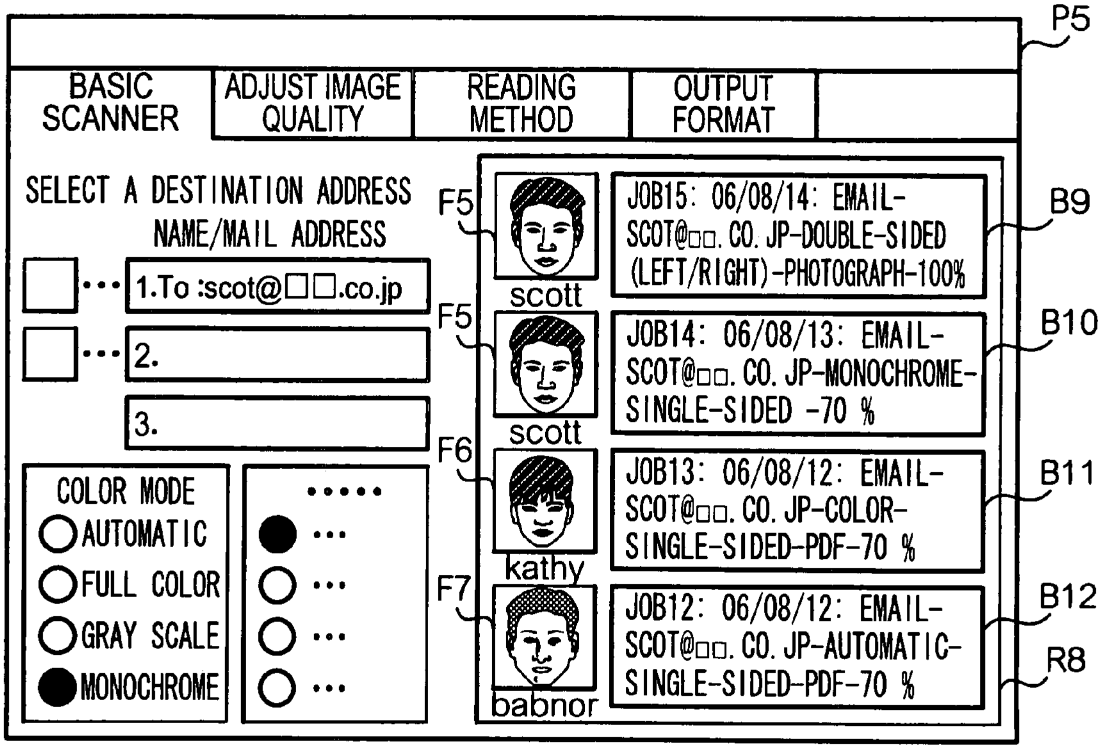
FIG. 14 shows a setting screen P5.

(3) The image forming device 1 can be configured so as to identify an operator who manipulates the display/manipulation unit 13, and specify an operator identifier (as identification information) assigned to the operator. Depending on the specified operator identifier, a processing information set 15*a* can be displayed. For example, an operator identifier (such as a user ID) assigned to the operator who manipulates the image forming device 1 is stored in advance in the storage unit 15. When the operator identifier is input by the operator who is going to manipulate the display/manipulation unit 13, the controller 11 then identifies the operator on the basis of the input operator identifier, and specifies the operator identifier assigned to the operator. When a processing is executed by the processing unit 14, the storage unit 15 stores a specified operator identifier related to a processing information set 15*a* for the processing. The controller 11 causes the display/manipulation unit 13 to display an image unique to the operator identifier, related to the processing information set 15*a* (for example, the image is a picture showing the face of the operator specified by the operator identifier). Image data expressing the unique image can be stored in advance in the storage unit 15, related to the operator identifier. FIG. 14 shows a setting screen P6 in which images unique to operator identifiers and processing information sets 15*a* are arranged related to each other. As shown in the figure, in a processing information list R8 provided in the setting screen P6, buttons B9, B10, B11, and B12 for specifying processings respectively related to processing information sets 15*a* are listed related to images F5, F6, and F7 unique to operators who gave instructions about the processings. Also as shown in the figure, operator identifiers assigned to the operators can be displayed related to corresponding images F5, F6, and F7, respectively.

Further, the controller 11 can cause the display/manipulation unit 13 to display only processing information sets 15*a* which are stored related to an operator identifier specified in a manner as described above. This is to display only processing information sets 15*a* which include setting items specified by manipulation conducted by the operator. For example, an operator who is assigned an operator identifier "userA" inputs this operator identifier to log in, and allows the image forming device 1 execute a processing. Then, a processing information set 15*a* which includes setting items for the executed processing is stored in the storage unit 15, related to the operator identifier "userA". When the operator assigned with "userA" logs in again to use the image forming device 1, only the processing information set 15*a* stored related to the operator identifier "userA" is displayed in a processing information list. That is, only processing information sets 15*a* related to processings which were executed by an operator are presented to the operator.

Further, the controller 11 can present, to ordinary operators, processing information sets 15*a* each of which includes setting items constituting content of a setting for a processing manipulated by a model operator who is experienced in the use of image forming devices. For example, an operator identifier “expertA” is assigned to a model operator, and an operator identifier “userB” is assigned to an ordinary operator. The model operator assigned with “expertA” logs in with use of the operator identifier assigned to the model operator, and lets the image forming device 1 execute a processing. Then, a processing information set 15*a* including content (e.g., setting items) of a setting for the processing is stored in the storage unit 15, related to the operator identifier “expertA”. When the ordinary operator assigned with “userB” logs in by inputting the operator identifier assigned to the ordinary operator, the processing information set 15*a* stored related to the operator identifier “expertA” is then displayed arranged in a processing information list on the display/manipulation unit 13, i.e., the processing information set 15*a* related to a processing executed by the model operator assigned with “expertA” is displayed.

(4) The above exemplary embodiments can be configured so that the image forming device 1 identifies a person concerned with a processing and specifies a concerned person identifier assigned to the identified concerned person. The display/manipulation unit 13 can be caused to display an image unique to the specified concerned person identifier, related to a processing information set 15*a*. For example, in case of a processing for sending image data by an electronic mail, the concerned person can be a user as a destination which the mail is addressed to. Further, the image unique to a concerned person identifier is, for example, a picture showing a face of an operator specified by the concerned person identifier. When a processing is executed by the processing unit 14, the storage unit 15 stores a concerned person identifier (such as a user name) of a person concerned with the processing, related to a processing information set 15*a* corresponding to the processing. The controller 11 causes the display/manipulation unit 13 to display an image unique to the concerned person identifier, related to the corresponding processing information sets 15*a*. Further, concerned person identifiers are positioned related to the processing information sets 15*a*. Image data expressing such a unique image can be stored in advance in the storage unit 15. There is now supposed, as an example, a processing information set 15*a* which includes setting items constituting content of a setting for sending image data addressed to a concerned person “scott”. With respect to this processing information set 15*a*, buttons for specifying processings related to the processing information set 15*a* and an image unique to the concerned person “scott” are positioned, with the buttons and the image related to each other. In addition, a concerned person identifier can be positioned related to the buttons for specifying processings related to the processing information set 15*a*.

(5) In the step S160 in the above exemplary embodiments, the controller 11 assigns a new identifier to a specified processing information set 15*a*, and stores the processing information set 15*a* into the storage unit 15, related to a date when a corresponding processing was executed. However, a case may occur where an operator happens to specify, by mistake, unintended setting items “copy”, “DADF”, and “monochrome” by manipulating the display/manipulation unit 13. In such a case the operator subsequently presses a button “cancel” to cancel the specified unintended setting items, and then re-specifies “scan” and “color”. In this case, if all of the cancelled and re-specified setting items are stored, the storage unit 15 stores a processing information set 15*a* together with unnecessary setting items. Besides, the processing information set 15*a* stores the setting items “copy” and “scan” together although both setting items cannot be executed at the same time. Corresponding processings can therefore not be executed properly. To prevent such a case, if a manipulation is made to cancel specified setting items, the controller 11 can be allowed to store setting items, excluding the cancelled setting items cancelled by the manipulation. However, there are setting items such as “DADF” and the like which allow proper execution of processings even if the setting items are specified together with any of the setting items “copy” and “scan”. Such setting items can be stored together in the storage unit 15.

(6) In the step S140 in the above exemplary embodiments, the controller 11 can detect a manipulation which is made to change content (e.g., setting items) of a setting even after content of a setting is once displayed. The controller 11 can then change displayed content so as to agree with the changed content. For example, on the setting screen P22 shown in FIG. 8, an operator is supposed to manipulate the display/manipulation unit 13 by pressing the button B8 “job1: 06/08/11: copy—output format—DADF—double to double—100%—automatic sheet—2up”. When the operator intends to change the setting item “2up” to “4up” in this processing information set 15*a*, the operator makes a manipulation as follows. That is, the operator presses a button “all into one sheet (Nup)” provided in the left side on the setting screen P22, to change the setting item “2up” to “4up”. The controller 11 then detects the manipulation, and causes the display/manipulation unit 13 to display the processing information set 15*a* in which the setting item “2up” has been changed to “4up”. Accordingly, the operator is invited to input an instruction for specifying a processing related to the processing information set 15*a* including the changed content.

(7) In the above exemplary embodiments, the controller 11 causes the display/manipulation unit 13 to display all of setting items included in each of listed processing information sets 15*a* among processing information sets 15*a* stored in the storage unit 15. However, the controller 11 can be configured so as to display setting items, excluding setting items which are specified by a manipulation on the display/manipulation unit 13. For example, there is a case that a manipulation for specifying setting items “copy” and “output format” is detected in the step S110, as described previously. In this case, the controller 11 causes the display/manipulation unit 13 to display setting items, except the “copy” and “output format”. Referring back to the setting screen P2 shown in FIG. 6, the controller 11 causes the display/manipulation unit 13 to display setting items, excluding “copy” and “output format” from setting items included in each of processing information sets 15*a* listed. For example, for a processing information set 15*a* assigned with “job3”, a corresponding button is labeled “job3: 06/08/15: platen—monochrome—100%—automatic sheet—sort”.

(8) In the step S160 in the above exemplary embodiments, the controller 11 assigns a new identifier to a processing information set 15*a* specified by a manipulation detected in the step S110, and stores the processing information set 15*a* into the storage unit 15, related to a date when a corresponding processing was executed. In other words, the storage unit 15 stores only the setting items which were specified by a manipulation of an operator on the display/manipulation unit 13, prior to actual execution of a corresponding processing.

In this respect, the controller 11 can be configured so as to store all setting items included in each of actually executed processings. In this case, the setting items to be stored can include not only setting items which are specified by manipulations of operators but also setting items specified beforehand as defaults independent from manipulations of operators. For example, if setting items “scanner”, “box #123”, “double to double”, and “automatic %” are specified by a manipulation of an operator, the controller 11 causes the storage unit 15 to store these setting items together with other setting items which have been specified in advance as defaults, such as "monochrome", "text", etc.

When the controller 11 causes the display/manipulation unit 13 to show a processing information set 15*a* related to setting items stored as described above, all of all the setting items stored in the storage unit 15 can be displayed, e.g., a processing information set 15*a* is displayed, labeled as "job4: 06/08/17: scanner—box #123—double to double—monochrome—text— . . . ".

Alternatively, the controller 11 can be configured so that among all of setting items included in each processing information set 15*a*, only setting items which were specified by an operator prior to execution of a processing related to the processing information set 15*a*. For example, if setting items stored in the storage unit 15 are "scanner", "box #123", "double to double", "automatic %", "monochrome", and "text", setting items specified by an operator are "scanner", "box #123", "double to double", and "automatic %", as described above. Default setting items (which were not specified by any operator) are "monochrome" and "text". Provided now that another operator specifies setting items "scanner" and "box #123", the controller 11 causes the display/manipulation unit 13 to display a processing information set 15*a* including the setting items specified by the another operator. At this time, however, the processing information set 15*a* is displayed as, for example, "job4: 06/08/17: scanner—box #123—double to double—automatic %". Content displayed in this manner includes the setting items specified by the operators but does not include default setting items.

(9) In the above exemplary embodiments, the controller 11 causes the display/manipulation unit 13 to display buttons for specifying processings related to processing information sets 15*a*, respectively. Identifiers, dates, and setting items related to processing information sets 15*a* are displayed as labels for distinguishing the buttons from each other. At this time, plural setting items are displayed arranged in a predetermined order in each label. However, the plural setting items can alternatively be arranged in an order in which the setting items were specified sequentially.

Figure 15:
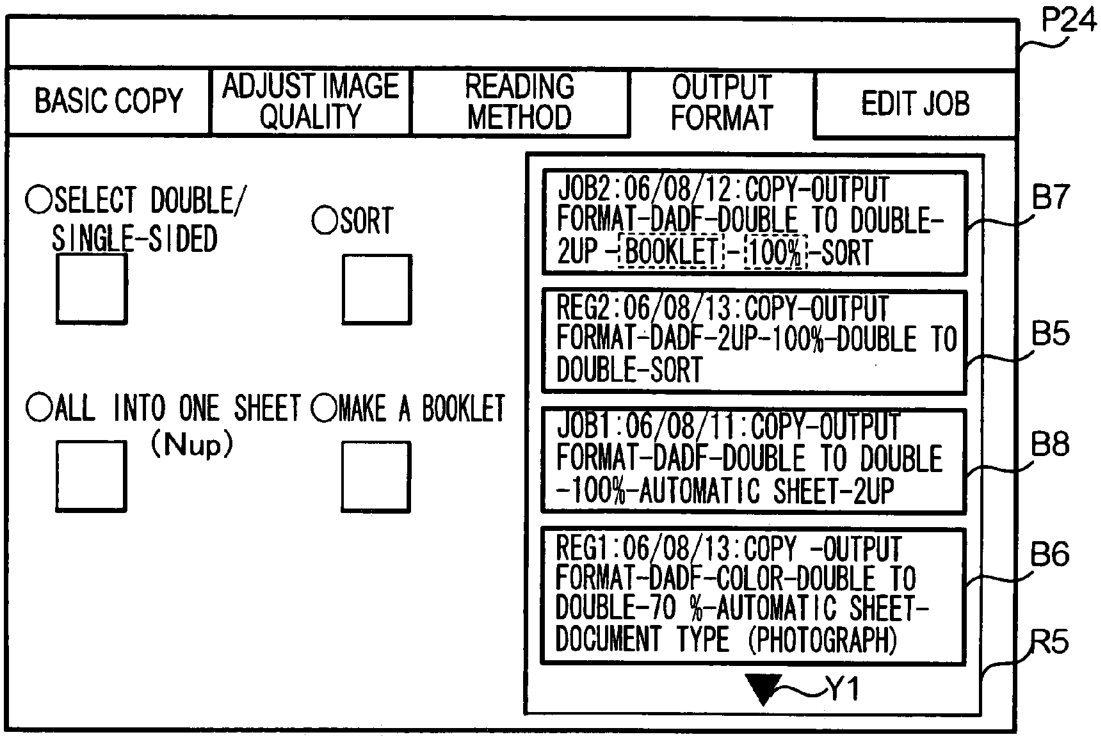
FIG. 15 shows a setting screen P24.

Further in the second exemplary embodiment, the controller 11 can perform control so that the setting items displayed as button labels are arranged in an order from a setting item related to the heaviest weight. FIG. 15 shows a setting screen P24 in which the setting items displayed in each of the button labels in the setting screen P23 shown in FIG. 11 are displayed rearranged in an order from a setting item related to the heaviest weight. For example, in FIG. 11, the setting items displayed in the button label of the processing information set 15*a* assigned with "job2" are arranged in an order of "copy", "output format", "DADF", "double to double", "2up", "100%", "booklet", and "sort". In FIG. 15, the same setting items are arranged in a different order of "copy", "output format", "DADF", "double to double", "2up", "booklet", "100%", and "sort". According to the weight table 15*b* in FIG. 10, a weight "10" is allocated to the setting item "magnification ratio" which belongs to a layer superior to a layer including the setting item "100%" in the hierarchical structure of setting items. On the other side, a weight "40" is allocated to the setting item "booklet". Therefore, the order of "100%" and then "booklet" is rearranged as "booklet" and then "100%".

(10) In the second exemplary embodiment, the weight table 15*b* can be configured so that combinations of setting items, which are prepared in advance in the image forming device 1, are related to weights (as weight information) allocated to the combinations, respectively. For example, a combination of setting items "double-sided/single-sided (double to double)" and "Nup" is related to a weight "80". Further, in the weight table 15*b*, a combination of setting items "manual tray" for reading images from paper sheets set on a manual feed tray and "OHP" for reading images from OHP sheets is related to a weight "80". The controller 11 specifies an order in which processing information sets 15*a* stored in the storage unit 15 are arranged from a processing information set 15*a* including a majority of combinations of setting items specified by manipulations.

(11) In the second exemplary embodiment, weights are preset by a manufacturer of the image forming device 1 or the like. However, the weights can be set or changed by manipulations of operators on the display/manipulation unit 13.

(12) In the second exemplary embodiment, the controller 11 can be configured so as to arrange processing information sets 15*a* stored in the storage unit 15 in an order from a processing information set 15*a* including a majority of specified setting items, and simultaneously so as to display only processing information sets 15*a* each including a setting item specified last by manipulating the display/manipulation unit 13. For example, if a manipulation is made to specify setting items "copy", "output format", "DADF", "2up", "sort", and "booklet" as described previously, only the processing information set 15*a* assigned with "job2", which includes the setting item "booklet" specified last, is listed in the processing information list R5 in the setting screen P23 displayed in the step S130. That is, processing information sets 15*a* assigned with "reg2", "job1", and "reg1", which do not include the setting item "booklet", are not displayed.

(13) In the above exemplary embodiments, the storage unit 15 stores processing information sets 15*a* each including content (e.g., setting items) of a setting for a processing which was executed by the processing unit 14, with the processing information sets 15*a* respectively related to dates when corresponding processings were executed. As an alternative, processing information sets 15*a* each including content (e.g., setting items) of a setting for a processing can be stored, respectively related to dates/times when corresponding processings were executed. In the invention, the wording "date/time (or dates/times)" is intended to mean only a date (or dates) or both of a date and a time (or both of dates and times).

(14) An information processing devices is not limited to the image forming device 1 exemplified in the above exemplary embodiments but can be any device as far as the device can execute a processing. Examples of such an information processing are a device which executes a calculation processing based on plural input parameters, a device which reproduced movies and/or voices on the bases of a user setting, etc. Further, content of each setting is not limited to setting items as exemplified in the above exemplary embodiments but can be constituted of any setting items as far as the setting items determine substantial content of a processing. In case of an information processing device different from the image forming device 1, applicable processings have different content from those of the image forming device 1, and accordingly have different content (e.g., setting items) of settings.

(15) In the above exemplary embodiments, the image forming device 1 has a structure including a display/manipulation unit 13, processing unit 14, and storage unit 15 as components. These components can be configured respectively as separate plural devices. For example, the image forming device 1 constitutes a first device. A server device connected to the image forming device 1 via a network constitutes a second device. A terminal device connected to the server device via the network constitutes a third device. The processing unit 14 is provided in the image forming device 1, and a display unit such as a liquid crystal display and an operation unit such as a keyboard or mouse are provided in the terminal device. In this case, the operation unit of the terminal device is manipulated to specify sequentially plural setting items on a display screen of the display unit. Then, the server device is notified of the setting items by the terminal device. The server device compares the notified setting items with setting items included in processing information sets 15*a* stored in the storage unit 15. The server device notifies the terminal device of processing information sets 15*a* each of which includes a majority of the specified setting items, together with an order of displaying the processing information sets 15*a*. In accordance with the processing information sets 15*a* and the order, the terminal device causes the display unit to display the processing information sets 15*a* arranged in the order. Any of the plural processing information sets 15*a* displayed on the display unit is specified by an operator. Then, the terminal device instructs the image forming device 1 to execute a processing corresponding to the specified processing information set 15*a*. In accordance with this instruction, the image forming device 1 executes the processing.

In the example described above, the first, second, and third devices are all separate devices. However, the first and second devices or the second and third devices can be integrated so as to form a single device. Likewise, the first and third devices can be integrated to form a single device.

(16) Software (program) describing procedures executed by the controller 11 of the image forming device 1 in the above exemplary embodiments can be provided as a recording medium which records the software (program). Examples of the recording medium are a magnetic tape, magnetic disk, flexible disk, optical recording medium, magneto-optical recording medium, CD (Compact Disk), DVD (Digital Versatile Disk), RAM, etc. Further, various devices can be allowed to download the software (program) via a network such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated.

What is claimed is:

1. An information processing device comprising:

a processing execution unit that executes processings each of which is specified by one or more setting items;

a processing information storage unit that stores one or more processing information sets each of which includes one or more setting items specifying one of processings executed by the processing execution unit;

a manipulation detection unit that detects a manipulation made by an operator; and a display control unit that causes, when one or more of the setting items are sequentially specified by a manipulation detected by the manipulation detection unit, a display unit to display the processing information sets stored in the processing information storage unit, the processing information sets being arranged in a predetermined order on the basis of the sequentially specified setting items contained within each of the information processing sets, wherein when the operator makes a manipulation to specify one of the processing information sets displayed by the display unit, the manipulation detection unit detects the manipulation, the processing execution unit executes one of the processings that is specified by setting items included in the specified one of the processing information sets, and the display control unit causes the display unit to display the processing information sets stored in the processing information storage unit, arranged in an order from one of the processing information sets that includes a majority of the specified setting items.

2. The information processing device according to claim 1, wherein the processing information storage unit stores the processing information sets each of which includes setting items for one of the processings executed by the processing execution unit, with the processing information sets respectively related to dates when corresponding ones of the processings were executed, and if ones of the processing information sets are arranged to be ranked even in order relative to one of the processing information sets that includes a majority of the specified setting items, the even ranked ones of the processing information sets are displayed arranged in an order related a most recent date when a processing corresponding to the even ranked ones of the processing information sets was executed.

3. The information processing device according to claim 1, wherein in addition to the processing information sets each of which includes setting items for one of processings executed by the processing execution unit, the processing information storage unit stores further processing information sets each of which includes one or more setting items registered by a manipulation detected by the manipulation detection unit, with the further processing information sets respectively related to registration dates when the further processing information sets were registered, and if ones of the processing information sets are arranged ranked even in the order from one of the processing information sets that includes a majority of the specified setting items, the even ranked ones of the processing information sets are displayed arranged in an order from one related to the most recent one of the registration dates.

4. The information processing device according to claim 1, further comprising:

a weight storage unit that stores weights respectively related to the setting items, wherein the display control unit specifies the order from one of the processing information sets that includes a majority of the specified setting items by use of the weights stored in the weight storage unit.

5. The information processing device according to claim 4, wherein the display control unit obtains a sum of weights that are related to the specified setting items included in each of the processing information sets stored in the processing information storage unit, and specifies an order from one of the processing information sets for which a greatest sum of weights is obtained as the order from one of the processing information sets that includes a majority of the specified setting items.

6. The information processing device according to claim 4, wherein the weight storage unit stores weights respectively related to combinations of the setting items, and the display control unit specifies the order from one of the processing information sets that includes a majority of the specified setting items by use of the weights respectively related to combinations of the setting items.

7. The information processing device according to claim 4, wherein the display control unit causes the display unit to display the processing information sets arranged in an order from one of the processing information sets that includes a majority of the specified setting items, and in each of the processing information sets displayed, the setting items included in each of the processing information set are displayed arranged in an order from one related to a greatest weight.

8. The information processing device according to claim 1, wherein the processing execution unit executes the processings, using image information sets, the processing information sets stored in the processing information storage unit respectively include an image information set used for corresponding processings, and the display control unit causes the display unit to display the image information sets as the processing information sets.

9. An information processing device comprising:

a processing execution unit that executes processings each of which is specified by one or more setting items;

a processing information storage unit that stores one or more processing information sets each of which includes one or more setting items specifying one of processings executed by the processing execution unit;

a manipulation detection unit that detects a manipulation made by an operator; and a display control unit that causes, when one or more of the setting items are sequentially specified by a manipulation detected by the manipulation detection unit, a display unit to display the processing information sets stored in the processing information storage unit, the processing information sets being arranged in a predetermined order on the basis of the sequentially specified setting items contained within each of the information processing sets, wherein when the operator makes a manipulation to specify one of the processing information sets displayed by the display unit, the manipulation detection unit detects the manipulation, the processing execution unit executes one of the processings that is specified by setting items included in the specified one of the processing information sets, and the display control unit causes the display unit to display a setting item specified last by a manipulation detected by the manipulation detection unit among the setting items specifying one of the processings executed by the processing execution unit.

10. An information processing device comprising:

a processing execution unit that executes processings each of which is specified by one or more setting items;

a processing information storage unit that stores one or more processing information sets each of which includes one or more setting items specifying one of processings executed by the processing execution unit;

a manipulation detection unit that detects a manipulation made by an operator;

a display control unit that causes, when one or more of the setting items are sequentially specified by a manipulation detected by the manipulation detection unit, a display unit to display the processing information sets stored in the processing information storage unit, the processing information sets being arranged in a predetermined order on the basis of the sequentially specified setting items contained within each of the information processing sets, and an operator identify unit that identifies an operator identifier assigned to an operator who makes a manipulation detected by the manipulation detection unit;

wherein when the operator makes a manipulation to specify one of the processing information sets displayed by the display unit, the manipulation detection unit detects the manipulation, the processing execution unit executes one of the processings that is specified by setting items included in the specified one of the processing information sets, each time when one of the processings is executed by the processing execution unit, the processing information storage unit stores the operator identifier identified by the operator identify unit, related to one of the processing information sets that corresponds to the one of the processings, and the display control unit causes the display unit to display images respectively unique to operator identifiers stored in the processing information storage unit related to the processing information sets.

11. An information processing device comprising:

a processing execution unit that executes processings each of which is specified by one or more setting items;

a processing information storage unit that stores one or more processing information sets each of which includes one or more setting items specifying one of processings executed by the processing execution unit;

a manipulation detection unit that detects a manipulation made by an operator;

a display control unit that causes, when one or more of the setting items are sequentially specified by a manipulation detected by the manipulation detection unit, a display unit to display the processing information sets stored in the processing information storage unit, the processing information sets being arranged in a predetermined order on the basis of the sequentially specified setting items contained within each of the information processing sets, and a concerned person identify unit that identifies a concerned person identifier assigned to a concerned person concerned with one of the processings;

wherein when the operator makes a manipulation to specify one of the processing information sets displayed by the display unit, the manipulation detection unit detects the manipulation, the processing execution unit executes one of the processings that is specified by setting items included in the specified one of the processing information sets, the processing information storage unit stores the concerned person identifier identified by the concerned person identify unit, related to one of the processing information sets that corresponds to the one of the processings, and the display control unit causes the display unit to display images respectively unique to concerned person identifiers stored in the processing information storage unit related to the processing information sets.

12. The information processing device according to claim 1, wherein the processing information storage unit stores the setting items sequentially specified by a manipulation detected by the manipulation detection unit without storing any cancelled setting items.

13. The information processing device according to claim 1, wherein the manipulation detection unit detects a manipulation for changing a setting item included in one of the processing information sets displayed by the display unit, and the display control unit causes the display unit to update the displayed setting items in accordance with the manipulation for changing a setting item detected by the manipulation detection unit.

14. An information processing device comprising:

a processing execution unit that executes processings each of which is specified by one or more setting items;

a processing information storage unit that stores one or more processing information sets each of which includes one or more setting items specifying one of processings executed by the processing execution unit;

a manipulation detection unit that detects a manipulation made by an operator; and a display control unit that causes, when one or more of the setting items are sequentially specified by a manipulation detected by the manipulation detection unit, a display unit to display the processing information sets stored in the processing information storage unit, the processing information sets being arranged in a predetermined order on the basis of the sequentially specified setting items contained within each of the information processing sets, wherein when the operator makes a manipulation to specify one of the processing information sets displayed by the display unit, the manipulation detection unit detects the manipulation, the processing execution unit executes one of the processings that is specified by setting items included in the specified one of the processing information sets, and the display control unit causes the display unit to display the setting items included in the processing information sets without displaying any setting items sequentially specified by a manipulation detected by the manipulation detection unit.

15. An information processing device comprising:

a processing execution unit that executes processings each of which is specified by one or more setting items;

a processing information storage unit that stores one or more processing information sets each of which includes one or more setting items specifying one of processings executed by the processing execution unit;

a manipulation detection unit that detects a manipulation made by an operator; and a display control unit that causes, when one or more of the setting items are sequentially specified by a manipulation detected by the manipulation detection unit, a display unit to display the processing information sets stored in the processing information storage unit, the processing information sets being arranged in a predetermined order on the basis of the sequentially specified setting items contained within each of the information processing sets, wherein when the operator makes a manipulation to specify one of the processing information sets displayed by the display unit, the manipulation detection unit detects the manipulation, the processing execution unit executes one of the processings that is specified by setting items included in the specified one of the processing information sets, each of the processing information sets stored in the processing information storage unit includes setting items, that are specified by a manipulation detected by the manipulation detection unit before execution of a processing corresponding to a processing information set including the setting items, and default setting items that are preset independently from the manipulation, and the display control unit causes the display unit to display both of the setting items specified by manipulation and the default setting items.

16. An information processing device comprising:

a processing execution unit that executes processings each of which is specified by one or more setting items;

a processing information storage unit that stores one or more processing information sets each of which includes one or more setting items specifying one of processings executed by the processing execution unit;

a manipulation detection unit that detects a manipulation made by an operator; and a display control unit that causes, when one or more of the setting items are sequentially specified by a manipulation detected by the manipulation detection unit, a display unit to display the processing information sets stored in the processing information storage unit, the processing information sets being arranged in a predetermined order on the basis of the sequentially specified setting items contained within each of the information processing sets, wherein when the operator makes a manipulation to specify one of the processing information sets displayed by the display unit, the manipulation detection unit detects the manipulation, the processing execution unit executes one of the processings that is specified by setting items included in the specified one of the processing information sets, each of the processing information sets stored in the processing information storage unit includes setting items, that are specified by a manipulation detected by the manipulation detection unit before execution of a processing corresponding to a processing information set including the setting items, and default setting items that are preset independently from the manipulation, and the display control unit causes the display unit to display only the setting items specified by manipulation without displaying the default setting items.

17. An information processing method comprising:

executing processings each of which is specified by one or more setting items;

storing processing information sets each including the one or more setting items specifying the executed processings;

detecting manipulations sequentially made by an operator;

specifying setting items on the basis of the detected manipulations;

displaying the stored processing information sets arranged in a predetermined order on the basis of the sequentially specified setting items contained within each of the information processing sets;

detecting manipulations made by the operator to specify one of the displayed processing information sets; and executing one of the processings that is specified by setting items included in the specified one of the displayed processing information sets, wherein displaying the stored processing information sets includes displaying the stored processing information sets arranged in an order from one of the processing information sets that includes a majority of the specified setting items.

18. A non-transitory computable-readable recording medium storing a program causing a computer to perform:

executing processings each of which is specified by one or more setting items;

storing processing information sets each including the one or more setting items specifying the executed processings;

detecting manipulations sequentially made by an operator;

specifying setting items on the basis of the detected manipulations;

displaying the stored processing information sets arranged in a predetermined order on the basis of the sequentially specified setting items contained within each of the information processing sets;

detecting manipulations made by the operator to specify one of the displayed processing information sets; and executing one of the processings that is specified by setting items included in the specified one of the displayed processing information sets, wherein displaying the stored processing information sets includes displaying the stored processing information sets arranged in an order from one of the processing information sets that includes a majority of the specified setting items.

19. An information processing method comprising:

executing processings each of which is specified by one or more setting items;

storing processing information sets each including the one or more setting items specifying the executed processings;

detecting manipulations sequentially made by an operator;

specifying setting items on the basis of the detected manipulations;

displaying the stored processing information sets arranged in a predetermined order on the basis of the sequentially specified setting items contained within each of the information processing sets;

detecting manipulations made by the operator to specify one of the displayed processing information sets;

executing one of the processings that is specified by setting items included in the specified one of the displayed processing information sets; and displaying a setting item specified last by a manipulation detected among the setting items specifying one of the processings executed.

20. An information processing method comprising:

executing processings each of which is specified by one or more setting items;

storing processing information sets each including the one or more setting items specifying the executed processings;

detecting manipulations sequentially made by an operator;

specifying setting items on the basis of the detected manipulations;

displaying the stored processing information sets arranged in a predetermined order on the basis of the sequentially specified setting items contained within each of the information processing sets;

identifying an operator identifier assigned to an operator who makes a manipulation;

detecting manipulations made by the operator to specify one of the displayed processing information sets;

executing one of the processings that is specified by setting items included in the specified one of the displayed processing information sets;

each time when one of the processings is executed, storing the identified operator identifier, related to one of the processing information sets that corresponds to the one of the processings, and displaying images respectively unique to operator identifiers stored related to the processing information sets.

21. An information processing method comprising:

executing processings each of which is specified by one or more setting items;

storing processing information sets each including the one or more setting items specifying the executed processings;

detecting manipulations sequentially made by an operator;

specifying setting items on the basis of the detected manipulations;

displaying the stored processing information sets arranged in a predetermined order on the basis of the sequentially specified setting items contained within each of the information processing sets;

identifying a concerned person identifier assigned to a concerned person concerned with one of the processings;

detecting manipulations made by the operator to specify one of the displayed processing information sets;

executing one of the processings that is specified by setting items included in the specified one of the displayed processing information sets;

storing the identified concerned person identifier, related to one of the processing information sets that corresponds to the one of the processings, and displaying images respectively unique to concerned person identifiers stored related to the processing information sets.

22. An information processing method comprising:

executing processings each of which is specified by one or more setting items;

storing processing information sets each including the one or more setting items specifying the executed processings;

detecting manipulations sequentially made by an operator;

specifying setting items on the basis of the detected manipulations;

displaying the stored processing information sets arranged in a predetermined order on the basis of the sequentially specified setting items contained within each of the information processing sets;

detecting manipulations made by the operator to specify one of the displayed processing information sets;

executing one of the processings that is specified by setting items included in the specified one of the displayed processing information sets; and displaying the setting items included in the processing information sets without displaying any setting items sequentially specified by a manipulation detected.

23. An information processing method comprising:

executing processings each of which is specified by one or more setting items;

storing processing information sets each including the one or more setting items specifying the executed processings;

detecting manipulations sequentially made by an operator;

specifying setting items on the basis of the detected manipulations;

displaying the stored processing information sets arranged in a predetermined order on the basis of the sequentially specified setting items contained within each of the information processing sets;

detecting manipulations made by the operator to specify one of the displayed processing information sets; and executing one of the processings that is specified by setting items included in the specified one of the displayed processing information sets, wherein each of the processing information sets stored includes setting items, that are specified by a manipulation detected before execution of a processing corresponding to a processing information set including the setting items, and default setting items that are preset independently from the manipulation, and displaying includes displaying both of the setting items specified by manipulation and the default setting items.

24. An information processing method comprising:

executing processings each of which is specified by one or more setting items;

storing processing information sets each including the one or more setting items specifying the executed processings;

detecting manipulations sequentially made by an operator;

specifying setting items on the basis of the detected manipulations;

displaying the stored processing information sets arranged in a predetermined order on the basis of the sequentially specified setting items contained within each of the information processing sets;

detecting manipulations made by the operator to specify one of the displayed processing information sets; and executing one of the processings that is specified by setting items included in the specified one of the displayed processing information sets, wherein each of the processing information sets stored includes setting items, that are specified by a manipulation detected before execution of a processing corresponding to a processing information set including the setting items, and default setting items that are preset independently from the manipulation, and displaying includes displaying only the setting items specified by manipulation without displaying the default setting items.

25. A non-transitory computable-readable recording medium storing a program causing a computer to perform:

executing processings each of which is specified by one or more setting items;

storing processing information sets each including the one or more setting items specifying the executed processings;

detecting manipulations sequentially made by an operator;

specifying setting items on the basis of the detected manipulations;

displaying the stored processing information sets arranged in a predetermined order on the basis of the sequentially specified setting items contained within each of the information processing sets;

detecting manipulations made by the operator to specify one of the displayed processing information sets;

executing one of the processings that is specified by setting items included in the specified one of the displayed processing information sets; and displaying a setting item specified last by a manipulation detected among the setting items specifying one of the processings executed.

26. A non-transitory computable-readable recording medium storing a program causing a computer to perform:

executing processings each of which is specified by one or more setting items;

storing processing information sets each including the one or more setting items specifying the executed processings;

detecting manipulations sequentially made by an operator;

specifying setting items on the basis of the detected manipulations;

displaying the stored processing information sets arranged in a predetermined order on the basis of the sequentially specified setting items contained within each of the information processing sets;

identifying an operator identifier assigned to an operator who makes a manipulation;

detecting manipulations made by the operator to specify one of the displayed processing information sets;

executing one of the processings that is specified by setting items included in the specified one of the displayed processing information sets;

each time when one of the processings is executed, storing the identified operator identifier, related to one of the processing information sets that corresponds to the one of the processings, and displaying images respectively unique to operator identifiers stored related to the processing information sets.

27. A non-transitory computable-readable recording medium storing a program causing a computer to perform:

executing processings each of which is specified by one or more setting items;

storing processing information sets each including the one or more setting items specifying the executed processings;

detecting manipulations sequentially made by an operator;

specifying setting items on the basis of the detected manipulations;

displaying the stored processing information sets arranged in a predetermined order on the basis of the sequentially specified setting items contained within each of the information processing sets;

identifying a concerned person identifier assigned to a concerned person concerned with one of the processings;

detecting manipulations made by the operator to specify one of the displayed processing information sets;

executing one of the processings that is specified by setting items included in the specified one of the displayed processing information sets;

storing the identified concerned person identifier, related to one of the processing information sets that corresponds to the one of the processings, and displaying images respectively unique to concerned person identifiers stored related to the processing information sets.

28. A non-transitory computable-readable recording medium storing a program causing a computer to perform:

executing processings each of which is specified by one or more setting items;

storing processing information sets each including the one or more setting items specifying the executed processings;

detecting manipulations sequentially made by an operator;

specifying setting items on the basis of the detected manipulations;

displaying the stored processing information sets arranged in a predetermined order on the basis of the sequentially specified setting items contained within each of the information processing sets;

detecting manipulations made by the operator to specify one of the displayed processing information sets;

executing one of the processings that is specified by setting items included in the specified one of the displayed processing information sets; and displaying the setting items included in the processing information sets without displaying any setting items sequentially specified by a manipulation detected.

29. A non-transitory computable-readable recording medium storing a program causing a computer to perform:

executing processings each of which is specified by one or more setting items;

storing processing information sets each including the one or more setting items specifying the executed processings;

detecting manipulations sequentially made by an operator;

specifying setting items on the basis of the detected manipulations;

displaying the stored processing information sets arranged in a predetermined order on the basis of the sequentially specified setting items contained within each of the information processing sets;

detecting manipulations made by the operator to specify one of the displayed processing information sets; and executing one of the processings that is specified by setting items included in the specified one of the displayed processing information sets, wherein each of the processing information sets stored includes setting items, that are specified by a manipulation detected before execution of a processing corresponding to a processing information set including the setting items, and default setting items that are preset independently from the manipulation, and displaying includes displaying both of the setting items specified by manipulation and the default setting items.

30. A non-transitory computable-readable recording medium storing a program causing a computer to perform:

executing processings each of which is specified by one or more setting items;

storing processing information sets each including the one or more setting items specifying the executed processings;

detecting manipulations sequentially made by an operator;

specifying setting items on the basis of the detected manipulations;

displaying the stored processing information sets arranged in a predetermined order on the basis of the sequentially specified setting items contained within each of the information processing sets;

detecting manipulations made by the operator to specify one of the displayed processing information sets; and executing one of the processings that is specified by setting items included in the specified one of the displayed processing information sets, wherein each of the processing information sets stored includes setting items, that are specified by a manipulation detected before execution of a processing corresponding to a processing information set including the setting items, and default setting items that are preset independently from the manipulation, and displaying includes displaying only the setting items specified by manipulation without displaying the default setting items.

* * * * *